United States Patent
Wei et al.

(10) Patent No.: US 7,239,074 B2
(45) Date of Patent: Jul. 3, 2007

(54) FIELD EMISSION DEVICE AND METHOD FOR MAKING THE SAME

(75) Inventors: Yang Wei, Beijing (CN); Liang Liu, Beijing (CN); Shou-Shan Fan, Beijing (CN)

(73) Assignee: Hon Hai Precision Industry Co., Ltd., Tu-cheng, Taipei Hsien (TW)

( * ) Notice: Subject to any disclaimer, the term of this patent is extended or adjusted under 35 U.S.C. 154(b) by 127 days.

(21) Appl. No.: 11/179,246

(22) Filed: Jul. 12, 2005

(65) Prior Publication Data

US 2006/0017363 A1    Jan. 26, 2006

(30) Foreign Application Priority Data

Jul. 22, 2004    (CN) .......................... 2004 1 0050829

(51) Int. Cl.
  *H01J 63/04*    (2006.01)
(52) U.S. Cl. ...................................... 313/495; 313/497
(58) Field of Classification Search .................. 313/497
See application file for complete search history.

(56) References Cited

U.S. PATENT DOCUMENTS

| 5,550,426 A | 8/1996 | Smith et al. |
| 6,290,564 B1 | 9/2001 | Talin et al. |
| 6,445,124 B1 | 9/2002 | Asai et al. |
| 6,692,791 B2 * | 2/2004 | Chang et al. .................. 427/77 |
| 2004/0189182 A1 * | 9/2004 | Liu et al. ..................... 313/495 |

* cited by examiner

*Primary Examiner*—David Bruce
*Assistant Examiner*—Conrad R. Blease
(74) *Attorney, Agent, or Firm*—Morris Manning & Martin LLP; Tim Tingkang Xia, Esq.

(57) ABSTRACT

A preferred method for making a field emission device (100) includes the steps of: providing an insulative substrate (101) with a surface (1011); defining a plurality of recesses (1012) in a desired pattern in the substrate; forming a cathode layer (104) in the recesses; forming a plurality of electron emitters (106) on the cathode; and forming a grid (111) on the surface of the substrate, such that the grid is insulated from the cathode.

17 Claims, 4 Drawing Sheets

FIELD EMISSION DEVICE AND METHOD FOR MAKING THE SAME

BACKGROUND OF THE INVENTION

1. Field of the Invention

The present invention relates to field emission devices, and more particularly to triode field emission devices and methods for making the same.

2. Description of the Related Art

Field emission is a phenomenon which occurs when an electric field proximate the surface of an emission material narrows the width of a potential barrier existing at the surface of the emission material. This allows a quantum tunneling effect to occur, whereby electrons cross through the potential barrier and are emitted from the emission material.

Field emission devices are used in a variety of applications, such as flat panel displays. A typical field emission device has a diode type structure made up of a cathode and an anode, or a triode type structure in which a grid is interposed between the cathode and the anode, such that the amount of electrons emitted from the cathode is controlled.

In a typical triode field emission device, an insulation layer is provided to support the grid and insulating the grid from the cathode. The insulation layer includes a plurality of uniform micro-holes which expose the cathode. Electrons emitted from electron emitters on the cathode can thus pass through the insulation layer. The micro-holes are difficult to make. Various methods for forming the insulation layer are usually complex, have relatively low precision, and/or are costly. For example, a printing process is a typical method for forming an insulation layer with micro-holes. The printing process has rather low precision.

U.S. Pat. No. 6,692,791 issued on Feb. 17, 2004 discloses a method for manufacturing a carbon nanotube field emission display. The method includes the steps of: providing a substrate; screen printing a first conducting layer on the substrate; sintering the first conducting layer; screen printing an isolation layer on the first conducting layer and a second conducting layer on the isolation layer; etching the second conducting layer and the isolation layer, whereby a cavity exposing the first conducting layer is formed; sintering the second conducting layer and the isolation layer; and forming a carbon nanotube layer on the first conducting layer in the cavity. In this carbon nanotube field emission display, the insulation layer is formed by a method includes the steps of screen printing an insulation layer, and etching a plurality of cavities through the insulation layer to expose the cathode. However, the screen printing process has relatively low precision. In addition, the two steps of screen printing and etching make the process relatively complex and costly.

What is needed, therefore, is a relatively simple method for making a quality field emission device.

SUMMARY

In a preferred embodiment, a field emission device includes an insulative substrate, a cathode with a plurality of electron emitters formed thereon, and a grid. The substrate has a surface. The substrate is defined a plurality of recesses therein. The recesses are arranged in a predetermined pattern. The cathode is positioned in the recesses. The grid is formed on the surface of the substrate and insulated from the cathode.

In another embodiment, a method for making a field emission device includes the steps of: providing an insulative substrate with a surface; defining a plurality recesses in a desired pattern in the substrate; forming a cathode in the recesses; forming a plurality of electron emitters on the cathode; and forming a grid on the surface of the substrate, such that the grid is insulated from the cathode.

Compared with a conventional field emission device and method for making the same, the field emission device of the preferred embodiments has an insulative substrate provided with a function of an insulation layer. This feature gives the field emission device the advantages of being simple and light. The method of the preferred embodiments also has the following advantages. The insulation layer between the cathode and the grid is formed to be a part of the substrate body by defining a plurality of recesses in the substrate. Thus the method avoids the need for the conventional process of printing in order to make an insulative layer insulating the grid from the cathode. In summary, the method is simple yet precise.

Other advantages and novel features will become more apparent from the following detailed description when taken in conjunction with the accompanying drawings, in which:

DETAILED DESCRIPTION OF THE PREFERRED EMBODIMENTS

Reference will now be made to the drawings to describe preferred embodiments of the present invention in detail.

Figure 1:
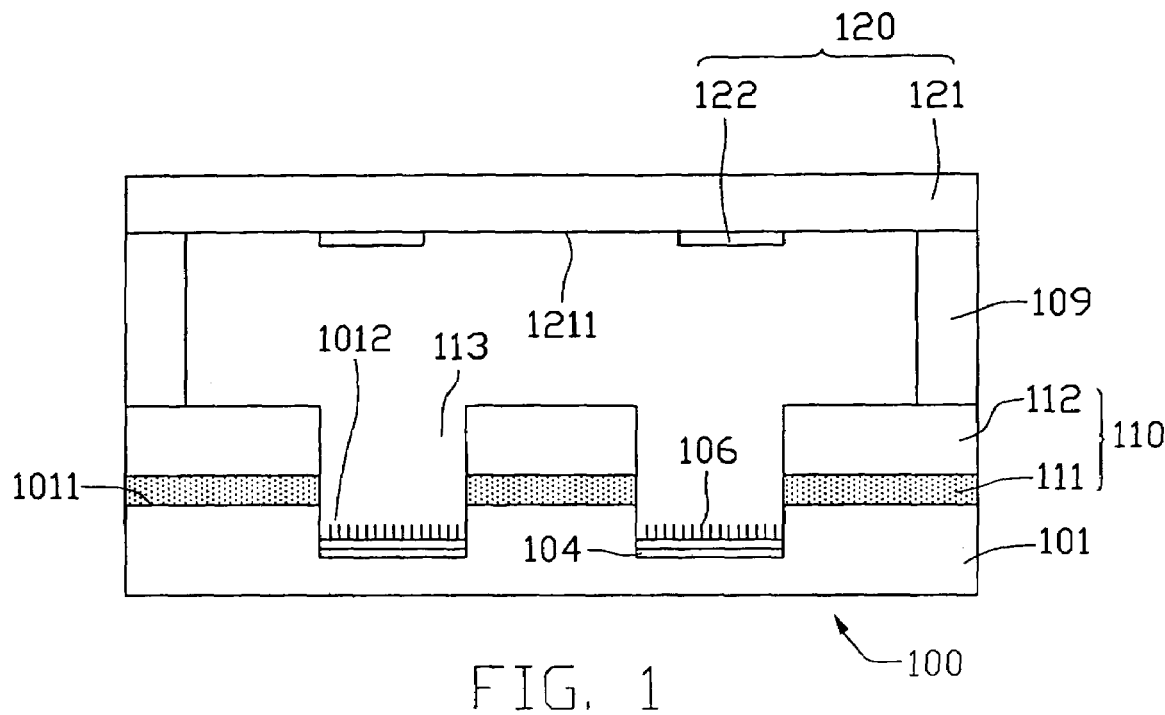
FIG. 1 is a schematic, abbreviated, cross-sectional view of a field emission device according to a first embodiment of the present invention.

Referring to FIG. 1, a preferred field emission device 100 according to a first embodiment of the present invention includes an insulative substrate 101, a cathode layer 104, a plurality of carbon nanotubes 106 functioning as electron emitters, a grid module 110, and an anode 120.

Generally, the substrate 101 is a silicon dioxide substrate. Other insulative material similar to silicon dioxide can also be used as the material of the substrate 101. The substrate 101 has a plurality of recesses 1012 formed in a desired pattern. In the illustrated embodiment, the pattern of the recesses 1012 is in the form of a group of parallel grooves. A cross section of the substrate 101 corresponding to each groove is rectangular. In other embodiments, the pattern may for example be an array of dents or holes.

The cathode layer 104 is formed in the recesses 1012. The cathode layer 104 is a layer of conductive material such as metal, which is preferably copper, platinum, gold, or silver. A plurality of the carbon nanotubes 106 is formed on the cathode layer 104. It should be noted that metal tips (such as molybdenum tips) or silicon tips, could instead be used as electron emitters.

The grid module 110 includes a grid 111 and a framework 112. The grid 111 is essentially a layer of conductive material such as metal. The framework 112 is a layer of insulative material. If desired, the framework 112 can be omitted. The grid module 110 is set on a surface 1011 of the substrate 101. The grid 111 is spaced and insulated from the carbon nanotubes 106. The grid module 110 defines a plurality of holes 113 therethrough. The holes 113 expose the corresponding carbon nanotubes 106.

The anode 120 includes an anode layer 121 and a fluorescence layer 122. The anode layer 121 is made of a transparent conductive material, such as ITO (Indium Tin Oxide). The fluorescence layer 122 is formed on a surface 1211 of the anode layer 121, such that the fluorescence layer 122 faces toward the grid module 110. A plurality of spacers 109 is formed on the grid module 110, for supporting the anode 120 and spacing the anode 120 from the grid module 110.

Figure 2:
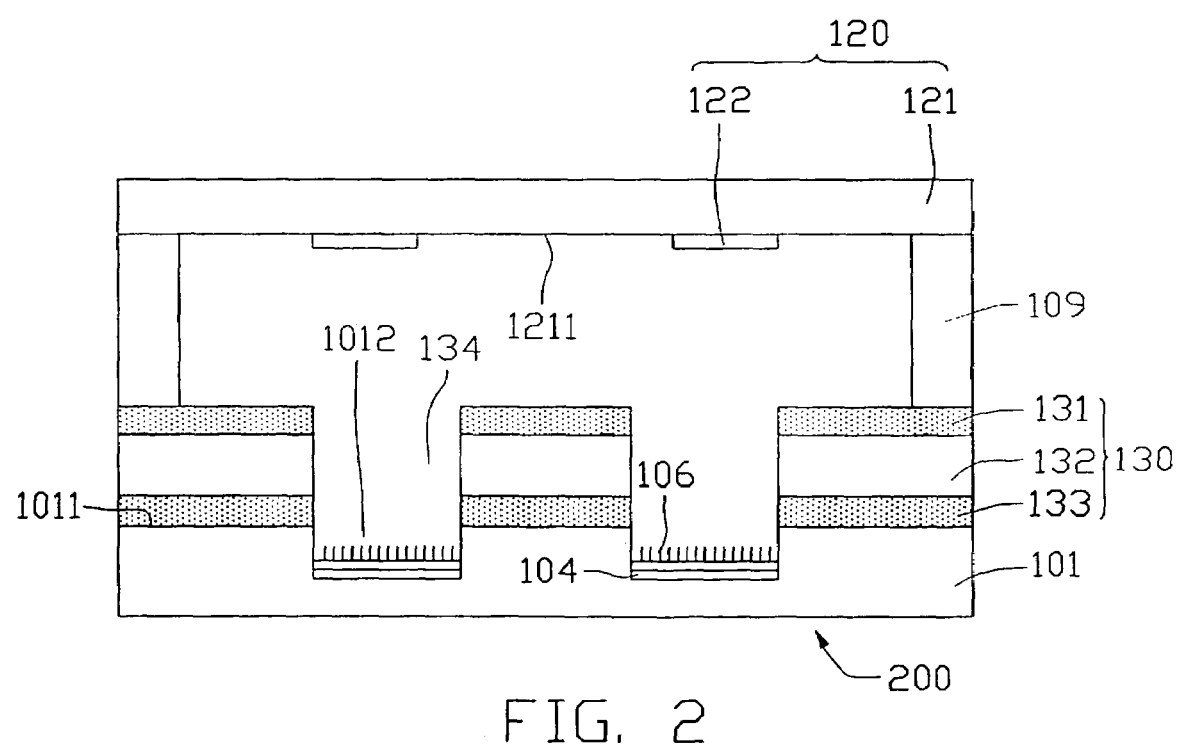
FIG. 2 is a schematic, abbreviated, cross-sectional view of a field emission device according to a second embodiment of the present invention.

FIG. 2 shows a preferred field emission device 200 according to a second embodiment of the present invention. The field emission device 200 is similar to the field emission device 100, except that the field emission device 200 has a grid module 130 instead of the grid module 110. The grid module 130 includes a grid 133, a controlling electrode 131, and an insulative plate 132 sandwiched between the grid 133 and the controlling electrode 131. The grid module 130 defines a plurality of holes 134 therethrough. The holes 134 expose the corresponding carbon nanotubes 106. The controlling electrode 131 cooperates with the grid 133 to control electron emission from the carbon nanotubes 106.

Compared with a conventional field emission device, the field emission device of the preferred embodiments has an insulative substrate provided with a function of an insulation layer. This feature gives the field emission device the advantages of being simple and light.

A preferred method for making a field emission device in accordance with the present invention will be described below with reference to FIGS. 3 to 14.

Figure 3:
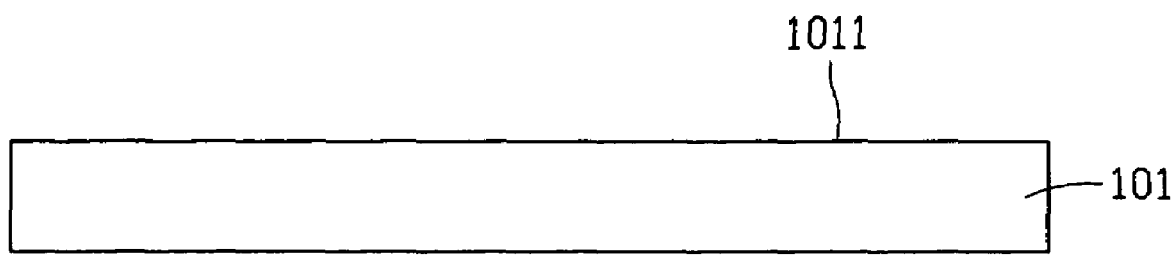
FIG. 3 is a schematic, side cross-sectional view of part of an insulative substrate used in a method for making a field emission device according to the present invention.

Referring to FIG. 3, the substrate 101 is provided. The substrate 101 has the surface 1011. Preferably, the surface 1011 is smooth. Generally, the substrate 101 is a silicon dioxide substrate. Other insulative material similar to silicon dioxide, such as silicon, can also be used as the material of the substrate 101.

Figure 4:
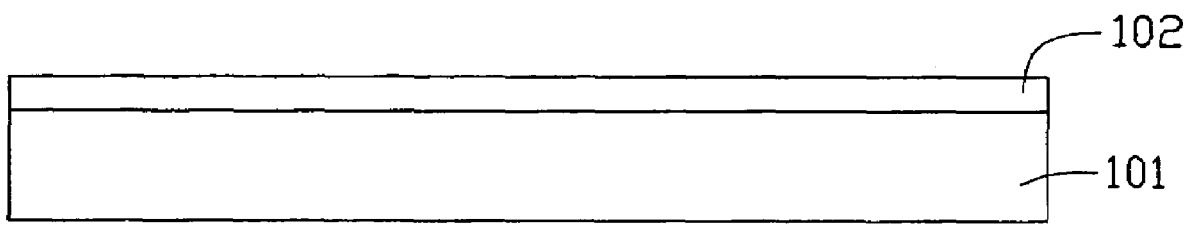
FIG. 4 is similar to FIG. 3, but showing a photo resist film formed on the substrate.

Referring to FIG. 4, a photo resist film 102 is formed on the surface 1011 of the substrate 101. In the illustrated embodiment, the photo resist film 102 is a positive photo resist film. Alternatively, the photo resist film 102 can be a negative photo resist film.

Figure 5:
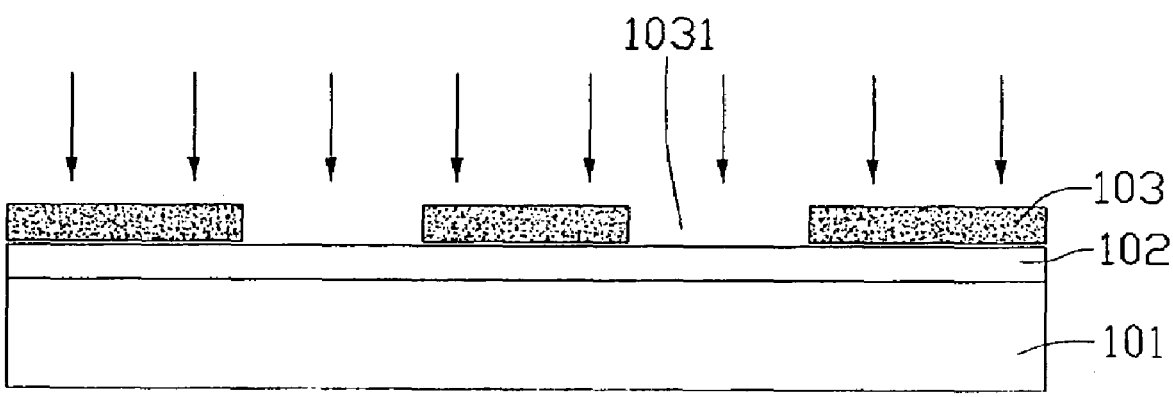
FIG. 5 is similar to FIG. 4, but showing an exposure process being performed using a mask placed above the photo resist film.

Referring to FIG. 5, a mask 103 is placed on the photo resist film 102, and an exposure process is performed. The mask 103 has exposure portions formed in a desired pattern, which may be an array of holes or a group of parallel slots. In the illustrated embodiment, the exposure portions of the mask 103 are a plurality of parallel slots 1031. Portions of the photo resist film 102 corresponding to the slots 1031 are thus exposed.

Figure 6:
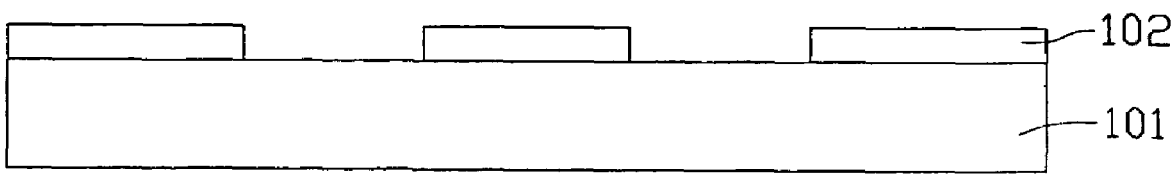
FIG. 6 is similar to FIG. 5, but showing residual parts of the photo resist film after other exposed parts of the photo resist film have been develop and removed.

Referring to FIG. 6, the exposed portions of the photo resist film 102 are developed. These developed portions are then removed. The resulting gaps in the photo resist film 102 expose corresponding portions of the substrate 101.

Figure 7:
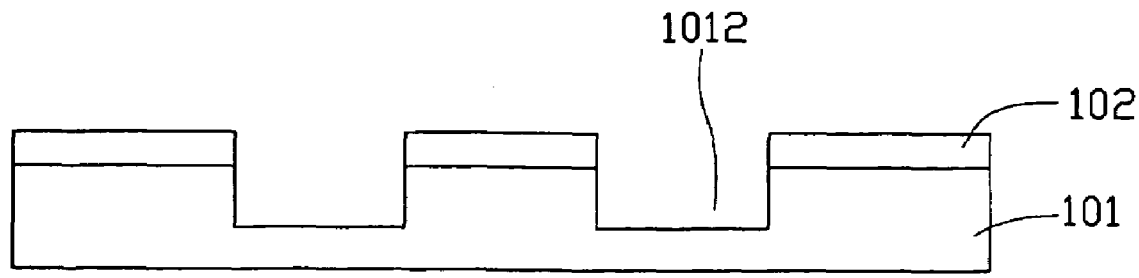
FIG. 7 is similar to FIG. 6, but showing a plurality of recesses formed in the substrate after an etching process has been performed.

Referring to FIG. 7, the exposed portions of the substrate 101 are etched, thereby creating a plurality of recesses 1012 (only two shown). In the illustrated embodiment, the recesses 1012 are a pattern of parallel grooves. A cross section of the substrate 101 corresponding to each groove is rectangular. Alternatively, the cross section corresponding to each groove may be trapezoidal, triangular, or arcuate. If the mask 103 has an array of holes, the recesses 1012 are formed as an array of corresponding dents.

Figure 8:
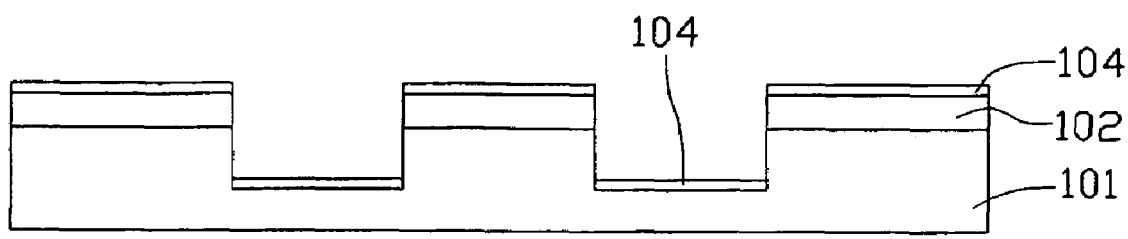
FIG. 8 is similar to FIG. 7, but showing a cathode layer formed in the recesses and on the residual parts of the photo resist film.

Referring to FIG. 8, the cathode layer 104 is formed in the recesses 1012 and also on residual parts of the photo resist film 102. The cathode layer 104 is a layer of conductive material such as metal, which is preferably copper, platinum, gold, or silver. In the illustrated embodiment, the cathode layer 104 is deposited by an e-beam evaporation process. Alternatively, a vacuum evaporation process, a sputter deposition process, or a printing process can be employed to form the cathode layer 104.

Figure 9:
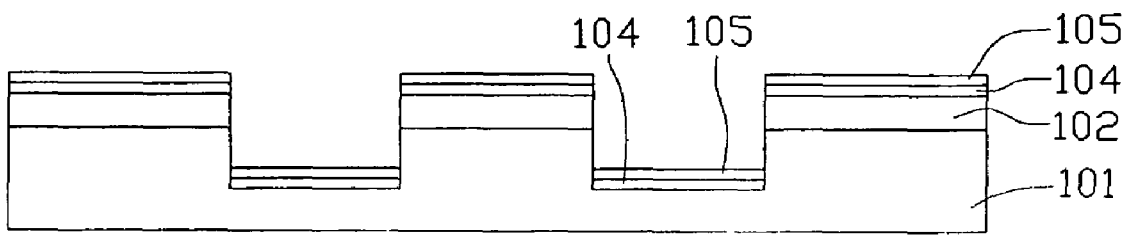
FIG. 9 is similar to FIG. 8, but showing a catalyst layer formed on the cathode.

Referring to FIG. 9, a catalyst layer 105 is formed on the cathode layer 104. Parts of the catalyst layer 105 in the recesses 1012 are later used to grow the carbon nanotubes 106. Generally, a material of the catalyst is a transition metal such as Fe (iron), Co (cobalt), Ni (nickel), or any suitable alloy thereof. A thickness of the catalyst layer 105 is in the range from 1 nm to 10 nm, and preferably in the range from 3 nm to 5 nm.

Figure 10:
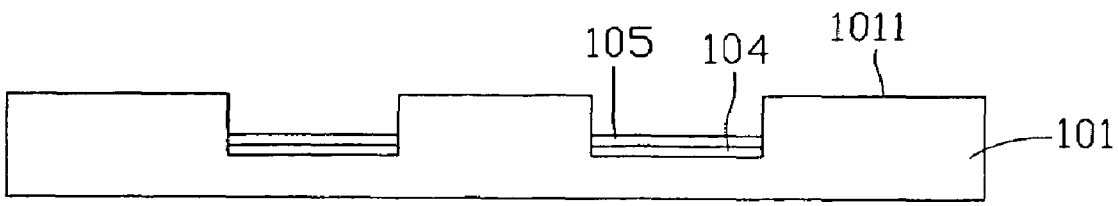
FIG. 10 is similar to FIG. 9, but showing the structure after the residual parts of the photo resist film with corresponding parts of the cathode layer and catalyst layer formed thereon have been removed.

Referring to FIG. 10, the residual parts of the photo resist film 102 with corresponding parts of the cathode layer 104 and catalyst layer 105 formed thereon are removed. The surface 1011 of the substrate 101 is thus exposed.

Figure 11:
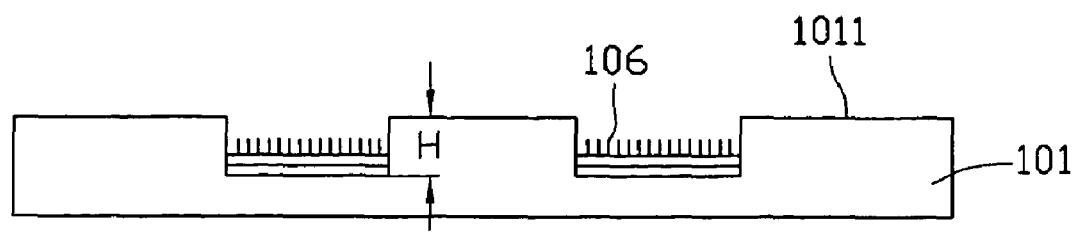
FIG. 11 is similar to FIG. 10, but showing carbon nanotubes formed on the cathode layer.

Referring to FIG. 11, the carbon nanotubes 106 are grown from the catalyst layer 105 by a chemical vapor deposition process, thereby forming a primary field emission device. A height of the carbon nanotubes 106 is controlled to meet the requirements of field emission in use. The height of the carbon nanotubes 106 is less than a depth H of the recesses 1012. Tops of the carbon nanotubes 106 are located below the surface 1011 of the substrate 101. In the illustrated embodiment, the carbon nanotubes 106 function as electron emitters.

It should be noted that the carbon nanotubes 106 can be formed on the cathode layer 104 by other processes, such as printing or arc discharge. Furthermore, metal tips (such as molybdenum tips) or silicon tips, could instead be used as the electron emitters. If metal tips or silicon tips are adopted as the electron emitters, the steps of forming the catalyst layer 105 and growing carbon nanotubes 106 are replaced by a process of depositing metal tips or silicon tips on the cathode layer 104.

Figure 12:
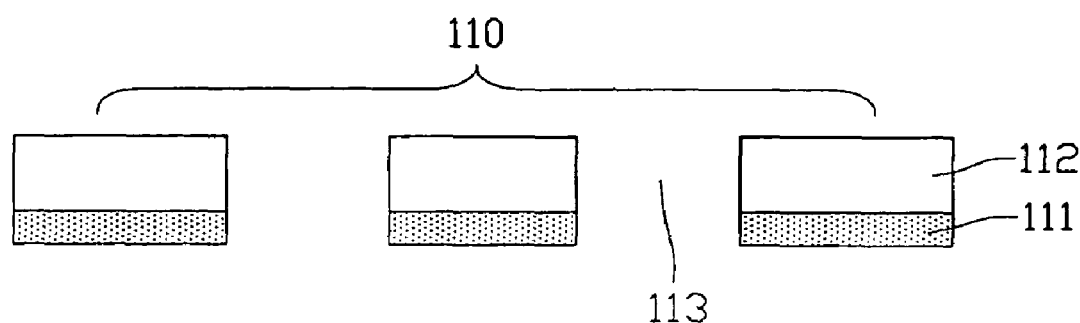
FIG. 12 is a schematic, side cross-sectional view of part of a grid module of the field emission device according to the first embodiment of the present invention.

FIG. 12 relates only to formation of the field emission device 100 according to the first embodiment of the present invention. The grid module 110 is provided, and is set on the surface 1011 of the substrate 101. The grid module 110 includes the grid 111 and the framework 112, the framework 112 being for supporting the grid 111. The grid 111 is spaced and insulated from the carbon nanotubes 106. The grid module 110 defines the plurality of holes 113, which are arranged in an array. The holes 113 expose the corresponding electron emitters, which are the carbon nanotubes 106 in the illustrated embodiment.

Figure 13:
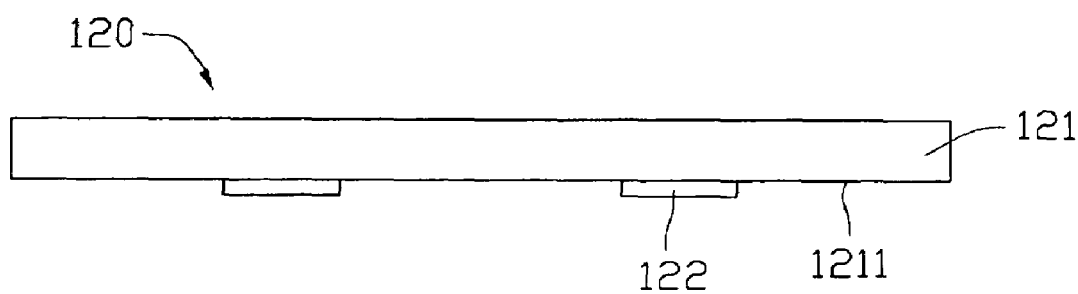
FIG. 13 is a schematic, side cross-sectional view of part of an anode of the field emission device according to the first and second embodiments of the present invention.

Referring to FIG. 13, the anode 120 is provided. The anode 120 includes the anode layer 121 and the fluorescence layer 122. The anode layer 121 is made of a transparent conductive material, such as ITO (Indium Tin Oxide). The fluorescence layer 122 is formed on the surface 1211 of the anode layer 121. The anode 120 is attached onto the primary field emission device with the spacers 109, such that the fluorescence layer 122 faces toward the grid module 110. Thus, the complete field emission device 100 is formed.

Figure 14:
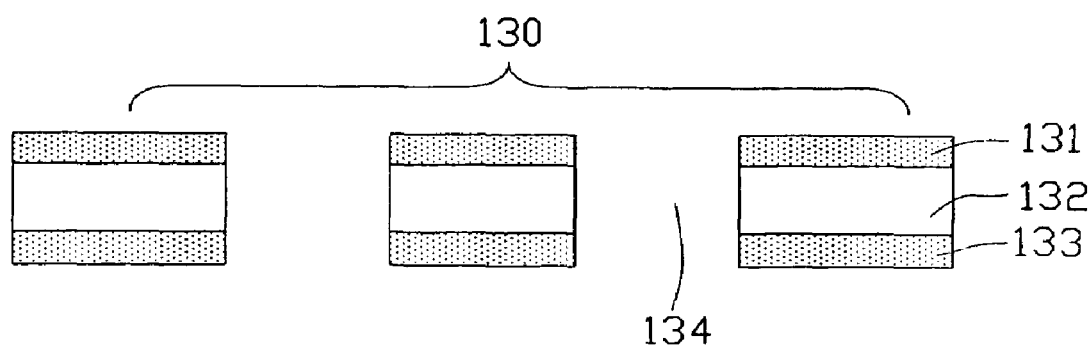
FIG. 14 is a schematic, side cross-sectional view of part of a grid module of the field emission device according to the second embodiment of the present invention.

FIG. 14 relates only to formation of the field emission device 200 according to the second embodiment of the present invention. The grid module 130 is provided. The grid module 130 includes the grid 133, the controlling electrode 131 and the insulative plate 132 sandwiched between the grid 133 and the controlling electrode 131. The grid module 110 defines the plurality of holes 134, which are arranged in an array and are for exposing the electron emitters. The controlling electrode 131 cooperates with the grid 133 to control electron emission. The grid module 130 is set on the surface 1011 of the substrate 101. Then the anode 120 is provided, as described above in relation to FIG. 13. The anode 120 is attached onto the corresponding primary field emission device with the spacers 109, such that the fluorescence layer 122 faces toward the grid module 130. Thus, the complete field emission device 200 with the controlling electrode 131 is formed.

In an alternative embodiment, the grid 111 can be printed on the surface 1011 of the substrate 101. That is, the framework 112 can be omitted.

In another alternative embodiment, the recesses 1012 can be formed by a machining process, such as punching process. In such embodiment, the recesses 1012 can be formed as an array of dents, a group of grooves, or as another kind of array or pattern. The machining process has the advantages of simplicity and low cost.

The method of the preferred embodiments also has the following advantages. The insulation layer between the cathode and the grid is formed to be a part of the substrate body by defining a plurality of recesses in the substrate. Thus the method avoids the need for the conventional process of printing in order to make an insulative layer insulating the grid from the cathode. In summary, the method is simple yet precise.

It is understood that the invention may be embodied in other forms without departing from the spirit thereof. Thus, the present examples and embodiments are to be considered in all respects as illustrative and not restrictive, and the invention is not to be limited to the details given herein.

We claim:

1. A field emission device comprising:
   an insulative substrate, the substrate defining a recess therein; and
   a cathode with a plurality of electron emitters formed thereon, the cathode being positioned in the recess.

2. The field emission device as described in claim 1, wherein the recesses being arranged in a predetermined pattern and the pattern is a group of parallel grooves.

3. The field emission device as described in claim 2, wherein a cross section of the substrate corresponding to any one or more of the grooves is selected from the group consisting of a rectangular cross section, a trapezoidal cross section, a triangular cross section, and an arcuate cross section.

4. The field emission device as described in claim 1, wherein the pattern is an array of dents.

5. The field emission device as described in claim 1, wherein the insulative substrate is a silicon dioxide substrate.

6. The field emission device as described in claim 1, wherein the plurality of the electron emitters is selected from the group consisting of carbon nanotubes, metal tips, and silicon tips.

7. The field emission device as described in claim 1, further comprising a gate electrode grid, the gate electrode being formed on the substrate and insulated from the cathode.

8. The field emission device as described in claim 7, wherein the grid defines a plurality of holes therein, the holes being arranged in an array for exposing the corresponding electron emitters.

9. The field emission device as described in claim 7, further comprising an anode, the anode having a surface, a fluorescent material layer being formed on the surface, the fluorescent material layer being opposite to the cathode and spaced from the grid.

10. The field emission device as described in claim 9, further comprising a controlling electrode, wherein the controlling electrode is set between the gate electrode grid and the anode and is spaced from the gate electrode grid and the anode respectively.

11. A field emission device comprising:
    an insulative substrate having a plurality of recesses defined therein;
    a plurality of cathodes, each cathode being positioned in a respective recess; and
    a plurality of electron emitters respectively formed in each recess and on each cathode.

12. The field emission device as described in claim 11, wherein the recesses are arranged in a predetermined pattern, and the pattern is a group of parallel grooves.

13. The field emission device as described in claim 12, wherein a cross section of the substrate corresponding to any one or more of the grooves is selected from the group consisting of a rectangular cross section, a trapezoidal cross section, a triangular cross section, and an arcuate cross section.

14. The field emission device as described in claim 11, wherein the pattern is an array of dents.

15. The field emission device as described in claim 11, further comprising a gate electrode grid, the gate electrode being formed on the insulative substrate.

16. The field emission device as described in claim 11, further comprising an anode, the anode having a surface, a fluorescent material layer being formed on the surface, the fluorescent material layer being opposite to the cathode and spaced from the grid.

17. A field emission device comprising:
an insulative substrate defining a recess therein; and
a cathode with a plurality of electron emitters formed thereon, the cathode being positioned in the recess; and
a grid electrode formed on the insulative substrate, the grid electrode positioned over the cathode at a distance apart from the electron emitters.

* * * * *

UNITED STATES PATENT AND TRADEMARK OFFICE
CERTIFICATE OF CORRECTION

PATENT NO. : 7,239,074 B2 Page 1 of 1
APPLICATION NO. : 11/179246
DATED : July 3, 2007
INVENTOR(S) : Yang Wei, Liang Liu and Shou-Shan Fan It is certified that error appears in the above-identified patent and that said Letters Patent is hereby corrected as shown below:

Title page, item [73] Assignee under 37 CFR § 3.81(b)

On the cover page, please replace item (73) Assignee, as follows:

Assignee: Tsinghua University, Haidian District, Beijing City, China, P.R.C.

Hon Hai Precision Industry Co., Ltd., Tu-Cheng City,
Taipei Hsien, TAIWAN

Signed and Sealed this

Twelfth Day of February, 2008

JON W. DUDAS
*Director of the United States Patent and Trademark Office*